POLY(2,6-DIPHENYLPARAPHENYLENEOXIDE) FIBER-REINFORCED SILICONE MOLDING COMPOSITIONS

This invention relates to a fiber-reinforced silicone molding composition which exhibits unique mechanical and electrical properties.

Various fiber-reinforced silicone compositions are known. The siloxane polymers and copolymers commonly used exhibit very good thermal stability and insulating qualities. Consequently, these compositions form a suitable material for some electrical applications. However, since the mechanical properties of such compositions generally are inadequate, the compositions are usually reinforced with a filling material such as carbon black, minerals and fibers, for instance glass fibers.

Obviously, it is also possible to use other fibers to reinforce these compositions; but usually the other fibers will lose their favorable properties at elevated temperatures.

The known glass fiber-reinforced silicone compositions are suitable for electrical applications as long as the dielectric constant need not be low. Otherwise, the known compositions are less suitable, because of their high dielectric constant resulting from the presence of the glass.

Advantageously, this invention provides fiber-reinforced silicone compositions which overcome the problems of the known compositions. Thus this invention contemplates a fiber-reinforced silicone composition that may be molded into shaped articles which combine a satisfactory strength with a resistance to high temperatures, a high electric resistance and a low dielectric constant. This combination of properties makes these compositions particularly suitable for applications such as carrier material, spacers for high-tension cables, and parts for apparatus in which high frequencies, and especially those in which very high frequencies (for instance of $10^9$ c.p.s.), are employed. Owing to its resistance to high temperatures the composition of this invention may be used in the manufacture of electric motors, generators, electromagnets, transformers, etc.

The fiber-reinforced silicone molding compositions of this invention are characterized in that the silicone component has a dielectric constant which is lower than 3.5, and in that the fibers consist of poly(2,6-diphenylparaphenyleneoxide), (referred to hereinafter as 2,6-DPPPO).

Fibers from 2,6-DPPPO are known and described in, inter alia, the Netherlands Patent Application 68—06989 (which corresponds to the Belgian Patent Specification 715,114).

Silicones having a dielectric constant lower than 3.5 are also known. In general these polymers are compounds with few if any polar groups, and, more particularly, compounds having a high content of phenyl groups.

The preferred silicone component of the composition of this invention is a setting compound or polymer, that is a polymer which is capable of being converted into a cross-linked product. The use of this type of polymer permits the composition to be given a particular shape in which it is set. A method of the afore-described type is known.

It is preferred that the silicone polymer used should be thermo-setting. As a result, the composition while being heated can be processed into the desired shape by a known technique such as injection molding, extrusion molding, pressure molding, and the like, and by keeping the composition in the mold for some time. In general, the composition may be heated to temperatures of from 100° to 300° C. during the shaping operation.

The amount of fibers to be included in the compositions according to the invention may vary between wide limits. In general, the most favorable results are obtained if use is made of compositions that have a fiber content of from about 5 percent to about 70 percent by weight. Thus compositions having this fiber content are to be preferred.

The length of the fibers used may likewise vary between wide limits. The preferred fibers will generally have a length between 0.5 and 6 mm.

Since 2,6-DPPPO fibers show a surprisingly good adhesion to silicone and siloxane polymers, there is no need to make use of adhesives. This is of particular advantage in that many adhesives have an adverse influence on the favorable properties of the compositions according to the invention.

The invention will be described further in the following examples:

EXAMPLE I

For the preparation of a thermosetting silicone resin use is made of a mixture of 40 mole percent of phenylsilicontrichloride (trichlorophenyl silane), 10 mole percent of diphenylsilicondichloride (dichlorodiphenyl silane), 40 mole percent of dimethylsilicondichloride (dichlorodimethyl silane) and 10 mole percent of methylsilicontrichloride (trichloromethyl silane). In a toluene medium the mixture, while under the influence of water, is converted into a pre-condensate. After formation of the pre-condensate the toluene solution is washed until acid free and evaporated in vacuo. The resulting resin contains approximately 1 percent by weight of condensable hydroxyl groups.

Then 40 parts by weight of this resin and 0.5 parts by weight of lead stearate are dissolved in 60 parts by weight of acetone, and the resulting viscous solution is used for impregnating paper sheet 100 microns thick made from 2,6-DPPPO fibers. The impregnated paper is dried in the air. A number of layers of the dried paper are formed into a laminated structure by pressing them successively for 2 minutes at 110° C., and for 30 minutes at 175° C.

Dependent on the number of layers this method makes it possible to obtain flexible, thin, reinforced sheets or thick, rigid, and dimensionally stable plates.

Owing to their unique dielectric and insulating properities it was found that these laminates are suitable to be used as insulating material for electric motors, dry transformers, and the like.

EXAMPLE II

Using a pair of heated rollers a pre-condensate prepared in the manner described in Example I is mixed with 40 percent by weight of 2,6-DPPPO fibers, 3 mm. in length. After a thorough intermixing of the two components the resulting composition is formed into a plate. The plate is pre-cured for 10 minutes at 100° C., and then cut into chips measuring approximately 1 mm. The chips may be shaped by application of the transfer molding technique. Owing to their very low dielectric losses it was found that these compositions are particularly suitable to be used as spacers in the electronics industry.

Also it will be understood that disks and more complex spacers of this composition are made by the transfer molding technique and are found to have very favorable mechanical and thermal properties.

What is claimed is:

1. A fiber-reinforced silicone molding composition comprising
   a silicone polymer capable of setting during a molding operation and having a dielectric constant lower than 3.5 and
   fibers of poly(2,6-diphenylparaphenyleneoxide), having a length of from about 0.5 to about 6 millimeters and which constitute from about 5 percent to about 70 percent by weight of the total weight of the composition.
2. Shaped articles made from the fiber-reinforced silicone molding composition of claim 1.

* * * * *

United States Patent

Bussink

[15] 3,665,051
[45] May 23, 1972

[54] POLY(2,6-DIPHENYLPARAPHENYLENEOXIDE) FIBER-REINFORCED SILICONE MOLDING COMPOSITIONS

[72] Inventor: Jan Bussink, Arnhem, Netherlands
[73] Assignee: Akzo N.V., Arnhem, Netherlands
[22] Filed: June 23, 1970
[21] Appl. No.: 49,172

[30] Foreign Application Priority Data

July 11, 1969 Netherlands..........................6,910,674

[52] U.S. Cl. ........................260/824, 117/138.8 A, 161/206, 252/63.2, 260/47 ET
[51] Int. Cl. .....................................C08g 42/02, C08g 47/10
[58] Field of Search..................................................260/824

[56] References Cited

UNITED STATES PATENTS

| | | | |
|---|---|---|---|
| 3,063,872 | 11/1962 | Boldebuck | 260/824 |
| 3,542,900 | 11/1970 | Lammers | 260/824 |
| 3,423,479 | 1/1969 | Hendricks | 260/824 |

OTHER PUBLICATIONS

General Electric Co., Netherlands Patent Application 6,806,989, printed Nov. 19, 1968.

Primary Examiner—Samuel H. Blech
Attorney—Stevens, Davis, Miller & Mosher

[57] ABSTRACT

A fiber-reinforced silicone molding composition that comprises an admixture of a silicone polymer having a dielectric constant lower than 3.5 and fibers of poly(2,6-diphenylparaphenyleneoxide).

2 Claims, No Drawings